United States Patent [19]

Connelly

[11] 4,437,450
[45] Mar. 20, 1984

[54] PORTABLE COOKING GRILL

[76] Inventor: William L. Connelly, 463 Kenwood Ave., Ottawa, Ontario, Canada, K2A 0K8

[21] Appl. No.: 415,326

[22] Filed: Sep. 7, 1982

[51] Int. Cl.³ .............................................. F24B 3/00
[52] U.S. Cl. ....................................... 126/30; 126/137; 248/225.3 A
[58] Field of Search ..................... 126/9 R, 9 B, 25 R, 126/25 A, 25 AA, 29, 30, 137, 140, 202; 248/205 R, 225.3 A; 99/450, 339

[56] References Cited

U.S. PATENT DOCUMENTS

| | | | |
|---|---|---|---|
| 2,523,200 | 9/1950 | Durst | 126/30 X |
| 2,827,846 | 3/1958 | Karkling | 126/30 X |
| 2,914,283 | 11/1959 | Jorgensen | 126/30 X |
| 2,960,979 | 11/1960 | Stone | 126/30 X |
| 2,977,953 | 4/1961 | Dowdy | 126/30 |
| 3,016,894 | 1/1962 | Clearly | 126/137 |
| 3,111,123 | 11/1963 | LeFort | 126/137 |
| 3,139,882 | 7/1964 | White | 126/137 |
| 3,162,113 | 12/1964 | Tallaksen | 126/30 X |
| 3,344,780 | 10/1967 | Anderson | 126/30 |
| 3,391,685 | 7/1968 | Lemmons et al. | 126/137 |
| 3,395,692 | 8/1968 | Johns | 126/30 |
| 3,498,210 | 3/1970 | O'Toole | 126/9 R X |
| 3,526,217 | 9/1970 | Garske | 126/30 X |
| 3,834,370 | 9/1974 | Nelson | 126/137 |
| 4,351,312 | 9/1982 | Ivy | 126/30 |
| 4,363,313 | 12/1982 | Smith | 126/30 X |

*Primary Examiner*—Samuel Scott
*Assistant Examiner*—Margaret A. Focarino
*Attorney, Agent, or Firm*—Stanley E. Johnson; Richard J. Hicks

[57] ABSTRACT

A portable cooking stand for indoor and outdoor use including a post and at least one grill assembly swingably and slidably mounted thereon. Each grill assembly has a sleeve slip-fittingly mounted on the post, a grill support in the form of a rod bent generally in the shape of a vee and having the nip portion thereof circumscribing the sleeve and rigidly secured thereto and an open grill resting on and secured to the grill support. A grill assembly support means is slidably mounted on the post, below the sleeve of the grill assembly, and includes lock means for securing the same to the post at any position longitudinally therealong. For supporting the stand in the open front wall of a fireplace there is provided anchoring means that includes a first plate slidably mounted on the post and projecting outwardly therefrom, a second plate slidable on the post and frictionally lockable at any position longitudinally therealong and a member threaded through the second plate and abutting the first plate to press the latter against the undersurface of the lintel extending across the fireplace opening.

2 Claims, 4 Drawing Figures

PORTABLE COOKING GRILL

FIELD OF INVENTION

This invention relates to a portable cooking stand for both indoor and outdoor use.

The invention is particularly directed to a cooking stand which may be readily assembled and disassembled, which takes up a minimum of storage space and may be easily erected for use either indoors or outdoors and when used indoors quickly and readily detachably mountable in a fireplace opening, even though the opening for the fireplaces may vary in size.

BACKGROUND OF INVENTION

There are a wide variety of portable cooking stands in use and disclosed in a number of patents, attention being directed particularly to the following:

U.S. Patents

U.S. Pat. No. 2,173,024,
U.S. Pat. No. 2,372,751,
U.S. Pat. No. 2,604,884,
U.S. Pat. No. 2,844,139,
U.S. Pat. No. 2,912,972,
U.S. Pat. No. 2,935,982,
U.S. Pat. No. 2,940,439,
U.S. Pat. No. 2,960,979,
U.S. Pat. No. 2,974,662,
U.S. Pat. No. 2,986,138,
U.S. Pat. No. 2,998,001,
U.S. Pat. No. 3,045,660,
U.S. Pat. No. 3,067,734,
U.S. Pat. No. 3,095,869,
U.S. Pat. No. 3,127,888,
U.S. Pat. No. 3,261,344,
U.S. Pat. No. 3,344,780
U.S. Pat. No. 3,395,692
U.S. Pat. No. 3,492,985
U.S. Pat. No. 3,526,217
U.S. Pat. No. 3,593,701
U.S. Pat. No. 3,785,360
U.S. Pat. No. 4,083,354
U.S. Pat. No. 4,094,296
U.S. Pat. No. 4,117,825
U.S. Pat. No. 2,805,658
U.S. Pat. No. 2,977,953
U.S. Pat. No. 3,094,113
U.S. Pat. No. 4,206,741
U.S. Pat. No. 4,120,279.

Canadian Patents

Canadian Pat. No. 74,753
Canadian Pat. No. 171,979
Canadian Pat. No. 200,271
Canadian Pat. No. 254,012
Canadian Pat. No. 259,703
Canadian Pat. No. 605,694
Canadian Pat. No. 655,776
Canadian Pat. No. 737,246.

Of the foregoing only one is directed to a portable cooking stand for use in a fireplace opening and is of such design and construction custom tailoring is required for each individual fireplace.

SUMMARY OF INVENTION

One object of the present invention is to provide a portable cooking device for use in association with a fireplace that may be readily and securely mounted therein with clamping means that is adjustable, adapting the device for use in fireplace openings of various sizes.

Another object of the present invention is to provide an improved portable cooking stand of relatively simple construction and thus easily manufactured.

In keeping with the foregoing, there is provided in accordance with one aspect of the present invention a portable cooking stand comprising a post; a grill assembly swingably and slidably mounted on said post, said grill assembly comprising a sleeve slip-fittingly mounted on said post, a grill support in the form of a rod bent generally into the shape of a vee and having the nip portion thereof circumscribing the sleeve and rigidly secured thereto; said grill support projecting outwardly from the post transverse to the longitudinal axis thereof and an open grill resting on and secured to said grill support, and a grill assembly support means slidably mounted on said post below the sleeve of the grill assembly and including lock means for securing the same to the post at any position longitudinally therealong.

In accordance with another aspect of the present invention, there is provided a portable cooking stand for use in an open fireplace comprising a post, at least one grill assembly swingably and slidably mounted on said post and projecting laterally therefrom, and adjustably movable means for supporting the grill assembly at any position longitudinally along the post, and post anchoring means for securing the cooking stand adjacent the front open wall of a fireplace when the lower end of the post rests on the fireplace hearth, said anchoring means comprising a plate slidably mounted on said post and projecting outwardly therefrom; means for supporting said plate at any selected position longitudinally along said post and adjustable means acting on said plate and plate support means for preseing the plate against the undersurface of the lintel extending across the fireplace opening at the upper portion thereof, thereby anchoring the cooking stand in position.

LIST OF DRAWINGS

The invention is illustrated by way of example in the accompanying drawings wherein.

DESCRIPTION OF PREFERRED EMBODIMENTS

Figure 1:
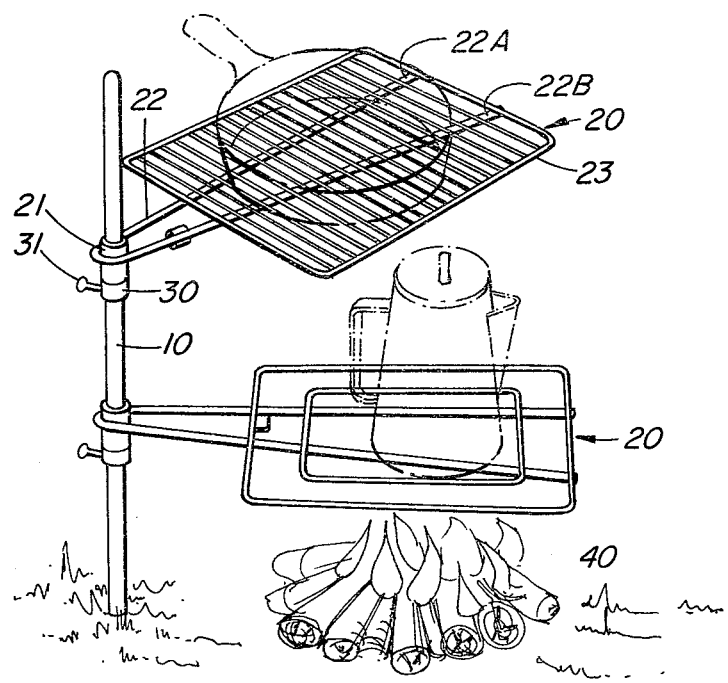
FIGS. 1 and 2 are vertical elevational views of a portable cooking stand provided in accordance with the present invention for use outdoors.
Figure 2:
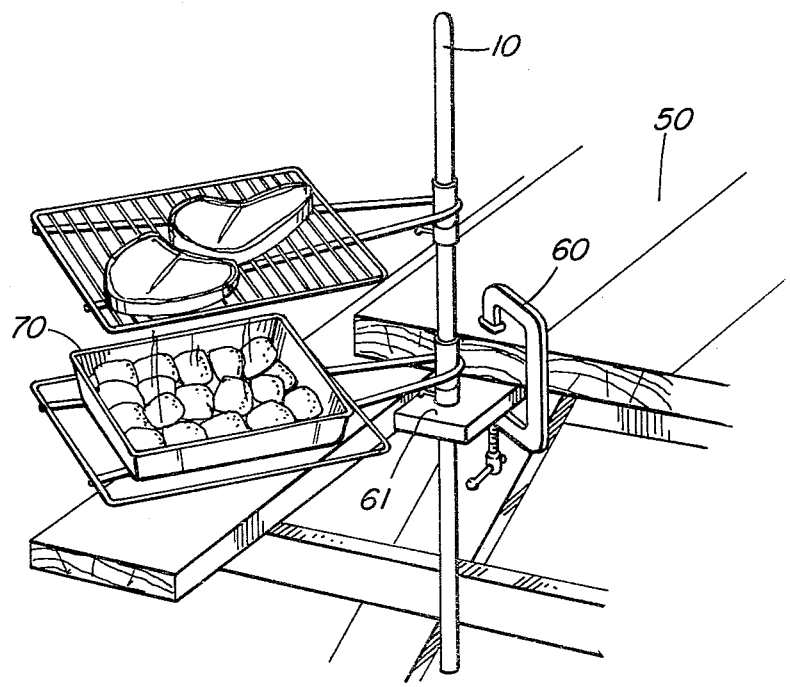

Referring to FIGS. 1 and 2 there is illustrated a portable cooking stand comprising a vertical post 10 having grill assemblies 20 swingably and slidably mounted on the post. Each grill assembly is supported by a collar 30 slidable longitudinally along the post and lockable at any position therealong by a set screw 31.

Each grill assembly comprises a sleeve 21 slip-fittingly mounted on the post and having a rod 22 rigidly secured thereto as by welding. The rod 22 is bent generally into a vee with the nip portion circumscribing the sleeve 21. Rod arms 22a and 22b diverge outwardly from one another and on which rests a grill assembly 23.

The grill assembly is secured to the rods as by welding or other suitable securing means.

In the embodiment illustrated in FIG. 1, the post 10 is driven into the ground and for this purpose has a pointed lower end (not shown) supporting the grills at an appropriate height over an open fire 40. The grill assemblies can be raised and lowered to an appropriate height depending upon cooking heat required from the fire and can be swung on the post away from the fire for ease in handling the cooking utensils.

In the embodiment illustrated in FIG. 2 the post 10 is shown detachably mounted on the end of a picnic table 50 by a clamp 60 and apertured plate 61. In the embodiment illustrated in FIG. 2 the lower grill assembly supports a pan 70 in which briquettes or other form of solid fuel may be retained for providing heat to cook food on the uppermost grill assembly. The pan 70 can be preformed or merely hand-shaped from a piece of aluminum foil as dictated by the circumstances.

Figure 3:
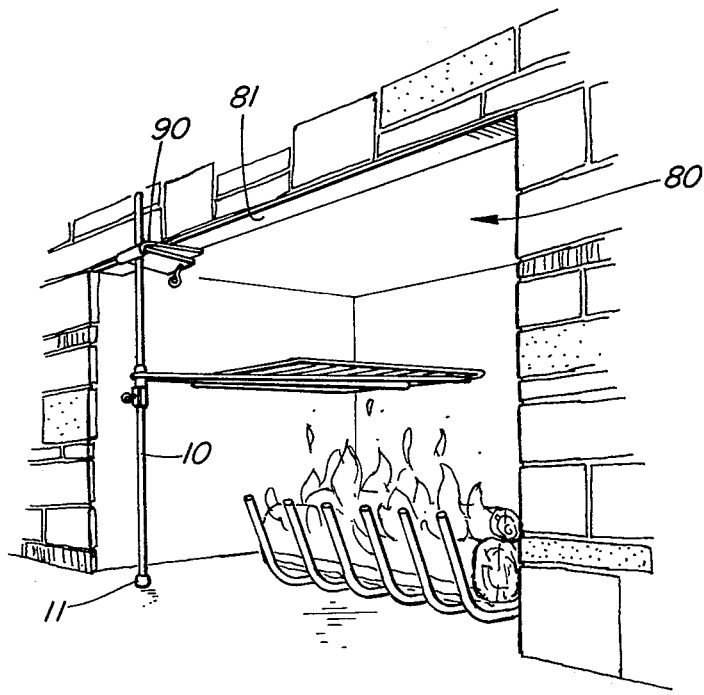
FIG. 3 is an oblique view illustrating a portable cooking stand provided in accordance with the present invention for use indoors in an open fireplace.

In the embodiment illustrated in FIG. 3 the portable cooking stand is detachably anchored in the open front wall of a fireplace 80. The post 10 has a footpiece 11 mounted thereon to avoid damaging the fireplace hearth and the post is secured in position by a clamping mechanism 90. The clamp is illustrated in more detail in FIG. 4 and consists of a plate 91 having an aperture therein so as to be slidably mounted on the post and project outwardly therefrom beneath the metal sill or lintel 81 extending across the upper opening of the fireplace. The plate 91 is supported on the post by a second plate 92 apertured as at 93 so as to be slidably movable along the post 10. A wing bolt 94 is threaded in an aperture 95 in plate 92 and projects therebeyond with a free outer end abutting plate 91. To secure the post in the fireplace opening, plates 91 and 92 are slid along the rod until plate 91 abuts the lintel 81 extending across the fireplace opening thereafter turning bolt 94 causes plate 92 to grip onto the rod by biting thereinto and sliding of the plates along the rod is thus prevented. Turning the screw presses plate 91 tightly against the lintel thereby securely anchoring the portable cooking stand in position. It will be obvious from being able to slide the plates along the post the portable cooking stand can be placed in fireplace openings of different heights limited only by the length of the post 10 relative to the opening.

In the case of extremely large fireplace openings an extension to the post may be provided, for example, by way of a tube or pipe fitted to one end or the other and securable thereto by way of a set screw.

Figure 4:
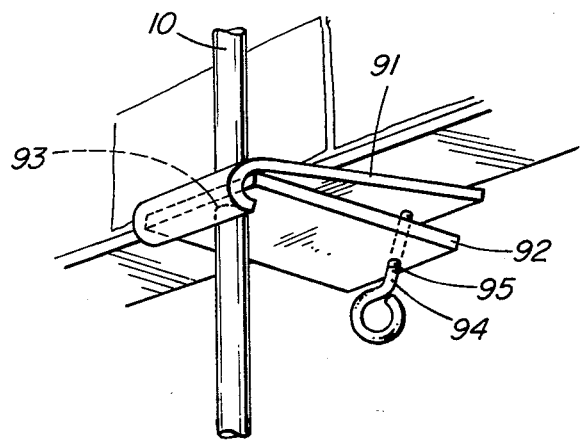
FIG. 4 is a partial oblique view of the clamping mechanism securing the post to the fireplace as illustrated in FIG. 3.

As will be apparent from FIG. 4 the plate 91 has a hooked end portion 93. The end of plate 92 seats in the hooked end portion of plate 91 so that both plates must rotate simultaneously on the post 10. When tightening the threaded bolt 95 against plate 91, this prevents plate 92 from pivoting on the post.

I claim:

1. A portable cooking stand for use in an open fireplace comprising:
   (a) a post;
   (b) at least one grill assembly swingably and slidably mounted on said post and projecting laterally therefrom;
   (c) adjustably movable means for supporting the grill assembly at any position longitudinally along the post; and
   (d) post anchoring means for securing the cooking stand adjacent the front open wall of a fireplace, when the lower end of the post rests on the fireplace hearth, said anchoring means comprising a pair of plates each having an aperture therein adjacent one end thereof slidably to receive the post, an uppermost one of said plates having a hooked end portion curving around a corresponding end portion of the lowermost plate and bolt means threaded through the lowermost plate and abutting the lower surface of the uppermost plate for pressing the uppermost plate against the undersurface of the lintel extending across the fireplace opening at the upper portion thereof to thereby anchor the cooking stand in position.

2. A portable cooking stand as defined in claim 1 wherein said grill assembly includes a grill support in the form of a rod bent generally in the shape of a vee and having the nip portion thereof circumscribing a sleeve and rigidly secured thereto, said grill support projecting outwardly from the post transverse to the longitudinal axis thereof; and an open grill overlying and resting on the outwardly projecting portions of the grill support and secured thereto.

* * * * *